United States Patent
Eldemallawy et al.

(10) Patent No.: US 6,416,572 B1
(45) Date of Patent: Jul. 9, 2002

(54) BINDER COMPOSITIONS FOR BONDING PARTICULATE MATERIAL

(75) Inventors: Emad Eldemallawy, Ingleburn; Christopher C. Nail, Illawong; Gregory J. Connor, Figtree, all of (AU)

(73) Assignee: Foseco International Limited, Swindon (GB)

( * ) Notice: Subject to any disclaimer, the term of this patent is extended or adjusted under 35 U.S.C. 154(b) by 0 days.

(21) Appl. No.: 09/645,037

(22) Filed: Aug. 24, 2000

(30) Foreign Application Priority Data

Dec. 2, 1999 (AU) .............................. 63039/99
Mar. 21, 2000 (GB) .............................. 0006751

(51) Int. Cl.$^7$ ................................ B28B 7/36
(52) U.S. Cl. ................ 106/38.27; 106/38.2; 106/38.22; 106/DIG. 1; 252/62
(58) Field of Search ............................ 106/38.2, 38.22, 106/38.27, DIG. 1; 252/62; 501/153, 154

(56) References Cited

U.S. PATENT DOCUMENTS

| | | | | |
|---|---|---|---|---|
| 2,947,641 A | * | 8/1960 | Bleuenstein | 106/38.3 |
| 3,615,755 A | * | 10/1971 | Uto et al. | 106/38.35 |
| 3,804,643 A | * | 4/1974 | Arita et al. | 106/38.35 |
| 3,852,085 A | * | 12/1974 | Vurlicer | |
| 4,121,942 A | * | 10/1978 | Kato | 106/38.3 |
| 4,316,744 A | * | 2/1982 | Bergna | 106/38.35 |
| 4,347,890 A | * | 9/1982 | Ailin-Pyzik et al. | 164/528 |
| 4,780,142 A | * | 10/1988 | Rechter | 501/133 |
| 4,963,191 A | * | 10/1990 | LaFleur | 106/698 |
| 5,134,100 A | | 7/1992 | Freudenberg et al. | |
| 5,238,518 A | * | 8/1993 | Okubi et al. | 156/326 |
| 5,743,953 A | * | 4/1998 | Twardowska et al. | 106/600 |
| 6,139,619 A | * | 10/2000 | Zarietskiy et al. | 106/629 |
| 6,284,688 B1 | * | 9/2001 | Trinkl et al. | 501/111 |

FOREIGN PATENT DOCUMENTS

| | | |
|---|---|---|
| EP | 0 630 872 A1 | 12/1994 |
| EP | 0 630 872 | 12/1994 |
| EP | 0 894 779 | 2/1999 |
| EP | 0 894 779 A1 | 2/1999 |
| FR | 1473665 | * 3/1967 |
| JP | 50108313 | * 8/1975 |
| JP | 55167182 | * 12/1980 |
| JP | 59107960 | * 6/1984 |
| JP | 63103870 | * 5/1988 |

* cited by examiner

*Primary Examiner*—Paul Marcantoni
(74) *Attorney, Agent, or Firm*—Nixon & Vanderhye P.C.

(57) ABSTRACT

A bonded particulate material and a method for forming an bonded particulate material are defined. The material includes a particulate metal oxide that is capable of forming a metalate in the presence of an alkali. The metal oxide particles are typically dissolved in a solution of the alkali and then dried, such that an undissolved metal oxide core remains, surrounded by a metalate which is in turn bonded to metalate of adjacent particle and/or to a fill material.

14 Claims, No Drawings

BINDER COMPOSITIONS FOR BONDING PARTICULATE MATERIAL

The present invention relates to binder compositions for bonding particulate materials. The invention has particular utility in the foundry industry, for forming bonded particulate articles, including foundry moulds and cores, and other refractory articles for use with hot molten metal, e.g. linings and feeder sleeves, including insulating, exothermic, and duplex (i.e. insulating and exothermic) sleeves.

The formation of foundry moulds and cores from bonded particulate refractory material, e.g. sand, is very well known. It is also very well known to form other refractory articles such as ladle linings, feeder head linings, feeder sleeves and the like, from bonded particulate materials. A feeder sleeve provides a reservoir for molten metal and enables the molten metal to remain molten longer than a casting in which it is being employed. The feeder sleeve thus enables the molten metal to continue to feed the casting as it solidifies, providing for a sound and strong casting. Refractory articles, such as linings and feeder sleeves consequently are often formed from insulating materials, to reduce heat losses. Some applications (such as feeder sleeves) involve the use of consumable insulators whilst others require insulators that are durable and able to repeatedly cycle through a range of temperatures. High grade, low density insulators (typically 0.5 g/cc) are known and are based on ceramic fibre. High density products, based on silica, typically have an open porous structure.

Feeder sleeves are produced by a variety of methods, including the resin bonding of waste silaceous materials such as so-called "flyash floaters" (sometimes known by the trade marks "Extendospheres" or "Cenospheres"). Foundry moulds and cores are often produced by the resin bonding of silica and/or other sand. Resin bonding is generally employed because, when the sleeves, moulds or cores are gas cured in a pattern box, the resin enables good strength and dimensional accuracy to be achieved. However, in the presence of molten metal the resins employed normally generate considerable amounts of fumes and gases. In some circumstances, this fume and gas is absorbed by the molten metal, leading to a deterioration in its quality. The fume problem is particularly problematic in the casting of low temperature alloys, for example those including aluminium where there is insufficient molten metal heat to burn the resins, but sufficient molten metal heat to volatise the components as smoke and fume. It would be advantageous if bonded particulate refractory articles, including moulds, cores and feeder sleeves, could be produced to good dimensional accuracy but without the problem of fume and smoke generation.

In a first aspect the present invention provides a method of producing a bonded particulate material comprising the steps of:
combining an alkali with a particulate metal oxide that is capable of forming a metalate in the presence of the alkali; and
drying the particles after a portion of each metal oxide particle has formed the metalate, in a manner such that an unreacted particle core remains after drying.

By maintaining a metal oxide core of each metal oxide particle in the resultant bonded particulate material, a refractory and/or insulating function can generally be provided and yet high dimensional stability and accuracy can normally be achieved. Also, a high degree of bonding between adjacent metal oxide particles can generally be achieved because the exterior surface of the metal oxide particles typically "dissolves", thus enabling a bond to form between adjacent metal oxide particles, and which bond "solidifies" after drying.

When the term "metal" is used in the present specification it is intended to include quasi metals such as silicon. When the expression "metal oxide" is used, it is used in relation to a solid metal oxide that is typically capable of use as a refractory material, an insulating material, a construction material, or other bonded particulate material. When the expression "particulate material" is used herein, it includes within its scope fibrous material and/or granular material and/or powder material and/or fines etc. The term "metalate" is used herein to refer to oxo anions (also known as "oxyanions") which may be considered as being formed by the co-ordination of oxide $O^{2-}$ ions with metal (including quasi metal, such as silicon) cations to form metal-and-oxygen anions, possibly including hydroxide groups, especially under alkaline conditions. These are the normal species in aqueous solution, however. their exact structures are often complex rather than simple discrete species, with typical examples including silicates, titanates, aluminates, zincates, germanates, etc. Such metal-and-oxygen anions (metalates) are then associated with alkali metal cations (such as $Na^+$ or $K^+$) from the alkali.

Most typically the alkali is in the form of an aqueous solution, such that "drying" involves driving off water from the mixture of the metal oxide and the alkali solution. However, if the reaction were conducted in the gas or molten phase, "drying" would mean adjusting the conditions to cause the reaction between the metal oxide and the alkali to stop.

Metal oxides that are preferably employed (and which typically function as a binding material) include silica fume, fine alumina, fine titania, zinc oxides etc (the use of "fine" referring to a fine particulate form of the oxide). These materials readily form a metalate in the presence of an alkali solution.

Preferably these types of metal oxides function as a "binder" in the insulator produced in accordance with the invention.

The metal oxide can also be a waste siliceous material, such as flyash, flyash floaters (FAF) or other oxidisable waste oxide; thus, a valuable product can be produced using waste material. (Flyash floaters are hollow microspheres of silica and/or alumina—they normally comprise aluminosilicate, possibly with other constituents.) A variety of other metal oxides can be employed. For example, silica sand, bauxite, alumina, perlite, etc can be employed. However, usually these latter materials (ie. including FAF) constitute a "filler" component of the bonded particulate material, and form the "bulk" of the bonded particulate material rather than providing the major binding function. The filler, or a combination of fillers, is then typically used in conjunction with and bonded by a binding material (as defined above). It should be appreciated, however, that either metal oxide binders or fillers can be used on their own to form the bonded particulate material. Also, some filler employed in the present bonded particulate materials may not have a reactive oxide consistency and hence may only form a relatively weaker bond with a binding material. Preferably when non-oxide fillers are employed they can still bind with a metalate, such as a silicate, aluminate, titanate, zincate etc.

Preferably the alkali is a solution produced from a strong alkali such as sodium hydroxide, potassium hydroxide, lithium hydroxide etc. Sodium hydroxide is most preferred because of its relative abundance and low cost.

In a preferred variation of the method, the binder material is premixed with the alkali solution prior to mixing the filler material therewith. When the alkali solution is based on sodium hydroxide, employing a premix can minimise the amount of alkali solution required. Because sodium acts as a flux in bonded particulate materials, it is desirable to minimise its presence in the resulting bonded particulate material, and it has been observed that the formation of the premix assists in reducing the quantity of sodium present in the resulting bonded particulate material.

Preferably the drying step is conducted in a microwave oven or urn. Microwave radiation has been observed to be an expedient way of achieving drying and forming a bond, thus maintaining a metal oxide core. However, conventional convection and radiation ovens and urns can be employed as can dielectric heating. Additionally or alternatively, a heated core box may be used and/or the drying may be by means of an applied vacuum. The drying, therefore, is preferably by means of heating, by convection and/or conduction and/or radiation (microwave and/or infrared radiation), and/or by means of evaporation, preferably by the use of reduced pressure, i.e. the application of a vacuum or partial vacuum.

In some preferred versions of the invention, there is a curing step prior to the drying step, i.e. the metalate may be partially or completely hardened prior to being dried. This has the advantage of increasing the strength of the particulate article, lessening the possibility of distortion or damage to the article, prior to the drying step. The hardening step may be by means of reaction with carbon dioxide, for example. Advantageously, an atmosphere of carbon dioxide gas may be supplied to the particulate article, for example in a core box or similar in which the article has been formed. The hardening step is generally facilitated if the premix (of binder material and alkali solution) has been aged (and especially if at least some dehydration has occured), for example by being allowed to stand for a period of time (preferably at least 6 hours) subsequent to its preparation and/or the premix has been exposed to microwave radiation.

Formulations having a relatively higher binder content were observed to have high storage strengths (ie. cured strength), but lower fired strength (ie. thermal shock resistance). As such, these formulations preferably are used in applications such as feeder and riser sleeves, and linings.

Formulations having a relatively lower binder content were observed to have higher fired strength, and lower cured strength. Such formulations preferably are used as refractory insulators, such as refractory bricks.

Bonded particulate materials can also be produced having various densities. Higher density materials are generally suitable for use as construction elements, having a lesser insulating function.

In a second aspect the present invention provides a bonded particulate material formed from a plurality of bonded metal oxide particles, wherein each particle has a metal oxide core, surrounded by a metalate layer.

Such a bonded particulate material is typically formed by the method of the first aspect of the invention.

In a third aspect, the present invention provides a binder for bonding a particulate material, comprising:
(a) a particulate metal oxide that is capable of forming a metalate in the presence of an alkali;
(b) an alkali; and
(c) water.

The particulate metal oxide preferably comprises silica, more preferably silica fume. The alkali preferably comprises sodium hydroxide and/or potassium hydroxide.

The alkali is preferably present in an amount of 3–50 weight %, the particulate metal oxide is present in an amount of 10–70 weight %, and the water is present in an amount of 30–70 weight %, based upon the total weight of the binder. More preferably, the alkali is present in an amount of 3–25 weight %, the particulate metal oxide is present in an amount of 20–55 weight %, and the water is present in an amount of 40–60 weight %, based upon the total weight of the binder.

According to a fourth aspect, the present invention provides a composition for forming a bonded particulate article, comprising:

(a) a binder according to the third aspect of the invention; and
(b) a refractory particulate material.

In some embodiments of the invention, the refractory particulate material and the particulate metal oxide may be one and the same material, i.e. the "bulk" or "filler" material may comprise part of the binder composition for bonding itself together. Additionally or alternatively, the particulate metal oxide may be a different material to the refractory particulate material, included as a separate component which is part of a binder composition. The refractory particulate material preferably comprises silica and/or alumina and/or aluminosilicate (e.g. in the form of hollow microspheres).

A fifth aspect of the invention provides a bonded particulate article formed from a composition according to the fourth aspect of the invention. Examples of bonded particulate articles according to the invention include: foundry moulds; foundry cores; feeder sleeves (insulating, exothermic and/or duplex sleeves); linings (e.g. furnace linings, ladle linings, tundish linings, etc.); flow controllers (for molten metal); strainer cores; strainer sleeves; tundish starter tubes; substantially any refractory article for use with molten metal.

Notwithstanding any other forms which may fall within the scope of the present invention, preferred forms of the invention will now be described, with reference to the following non-limiting examples.

Initial Experimentation

Initial experimentation sought to produce a riser sleeve (also known as a feeder sleeve) with the same dimensional accuracy but without the fume problem of a resin bonded insulator. The experiment focussed on the use of sodium silicate and flyash floaters (FAF).

EXAMPLE 1

The following procedure was used in an attempt to bond FAF with sodium silicate.
1. Flyash floaters were mixed with sodium silicate solution (various ratios were tried).
2. A test piece pattern (tensile test piece "dog bone") was then filled by hand.
3. At a predetermined time (in latter experimentation determined by the amount of dissolution of silica or other metal oxide) the test piece was stripped "green" from the patterns, onto a porous ceramic or plastic tile.
4. The test piece was transferred to a microwave or conventional oven and dried*.

*Microwaved at 600 kW for 60 seconds, or dried in a convection oven at 110° C. for 2–3 hours.

Various ratios of flyash floater to sodium silicate were tried, however all failed to produce satisfactory commercial bonded particulate materials. The mode of failure was observed to be cracking or exploding during step (4), or the final strength was too low for the test pieces to be handled.

EXAMPLE 2

Silica fume was proposed for use as a gellant (binder) in various refractory mixes. Tests were performed as in Example 1, with Step 1 being modified as follows:
1. Flyash floaters were mixed with a 25% solution of sodium hydroxide and water, and silica fume was then added (various ratios were tried).

The various ratios gave a range of strengths after curing. Some exhibited low storage strengths in humid conditions, whilst others exhibited low thermal shock resistance after being heated to 1000° C. in a muffle furnace. The results were as follows:

| Test No. | 1 | 2 | 3 | 4 | 5 | 6 | 7 |
|---|---|---|---|---|---|---|---|
| Weight FAF | 60 | 60 | 60 | 60 | 60 | 60 | 60 |
| Weight Water | 5 | 5 | 5 | 5 | 5 | 5 | 5 |
| Weight 25% NaOH | 10 | 10 | 10 | 10 | 10 | 10 | 10 |
| Weight Silica Fume | 1 | 2 | 3 | 4 | 5 | 6 | 10 |
| *Cured Strength (Storage Strength) | 296 | 308 | 440 | 633 | 747 | 747 | 1,159 |
| +Fired Strength (Thermal Shock Resistance) | 811 | 783 | N/R | 723 | 699 | 541 | 398 |
| ° Moisture | Below average | Below average | Below average | Below average | Below average | Average | Good |
| Density | 0.422 | 0.426 | 0.437 | 0.448 | 0.451 | 0.457 | 0.485 |

Formulation No. 4 was most suitable for use as an insulating "brick", and was observed to maintain or increase on its original strength after firing.

Formulation No. 7 was observed to be most suitable for use as a riser sleeve, being consumable, moisture resistant and having a high cured strength. For formulation 7 the fired strength was irrelevant.

EXAMPLE 3

In an attempt to keep the sodium hydroxide content to a minimum, premixtures of silica fume and sodium hydroxide were made. (This is because sodium acts as a flux, and so the minimum amount of sodium was observed to provide the highest refractoriness.)

A premix FS2 was made as follows:

| | |
|---|---|
| Silica Fume | 100 parts |
| 25% NaOH | 150 parts |
| Water | 300 parts |

The premix was then mixed with a filler (eg. FAF). The following results were achieved:

| Test | 10 | 11 |
|---|---|---|
| Weight FAF | 60 | 60 |
| Weight FS2 | 15 | 15 |
| Silica Fume | 0 | 5 |
| NaOH Content of Wet Mixture# | 1.36% | 1.28% |
| NaOH Content of Dry Mixture$ | 1.60% | 1.49% |
| *Cured Strength | 470 | 889 |
| +Fired Strength | 490 | 169 |
| °Moisture | Good | Good |

"Wet Mixture" means the mixture containing water, prior to curing and drying
$"Dry Mixture" means the mixture excluding the water Again formulation 10 was used as a brick, and formulation 11 was used as a riser sleeve, both with about half of the NaOH content of the formulations in Example 2.

EXAMPLE 4

A premix FS1 with the following recipe was also used.

| | |
|---|---|
| Silica Fume | 200 parts |
| 25% NaOH | 150 parts |
| Water | 300 parts |

The premix was then mixed with FAF and the following results were achieved:

| Test | 20 | 21 | 22 | 23 | 24 |
|---|---|---|---|---|---|
| Weight FAF | 60 | 60 | 60 | 60 | 60 |
| Weight FS1 | 15 | 15 | 15 | 20 | 25 |
| Silica Fume | 0 | 2 | 5 | 10 | 10 |
| *Cured Strength | 823 | 791 | 745 | 563 | 419 |
| +Fired Strength | 280 | 218 | N/A | 296 | 224 |
| °Moisture | Good | Good | Good | Good | Good |
| NaOH Content of Wet Mixture# | 1.15 | 1.12 | 1.08 | 1.28 | 1.52 |
| NaOH Content of Dry Mixture$ | 1.36 | 1.32 | 1.26 | 1.54 | 1.89 |

"Wet Mixture" means the mixture containing water, prior to curing and drying.
$"Dry Mixture" means the mixture excluding the water.

These formulations were observed to be satisfactory for use as a riser sleeve but not for use as a brick.

Also, as the silica fume content was increased it was observed that the fired strength decreased. This was most likely as a result of differential contraction rates occurring during the cool down cycle after a ceramic ("metalate") bond was formed.

EXAMPLE 5

To investigate other active (metal) oxides and their binding effect, alumina was premixed (A2) as follows:

| | |
|---|---|
| Alumina | 200 parts |
| 25% NaOH | 240 parts |
| Water | 300 parts |

This premix was then mixed with FAF as follows:

| Test | 30 | 31 | 32 |
|---|---|---|---|
| Weight FAF | 60 | 60 | 60 |
| Weight A2 | 20 | 20 | 20 |
| Weight Alumina | 0 | 2 | 5 |
| *Cured Strength | 250 | 200 | 235 |
| +Fired Strength | 100 | 129 | 88 |
| °Moisture | Below average | Average | Good |
| Density | 0.41 | 0.43 | 0.44 |

These formulations did not perform as well as the silica fume but formulation 32 was able to be used as a riser sleeve, with the added benefit of no free silica and good moisture resistance.

EXAMPLE 6

Further experimental formulations were prepared similar to the above, and showed that materials similar to silica fume, sodium hydroxide and flyash floaters could be used. These formulations included:

As Alkali

NaOH, KOH, LiOH, etc (typically all strong alkalies).

As Filler

FAF, Fly Ash, Silica Sand, Bauxite, Alumina, Perlite, etc and any other filler or combination of fillers that is capable of binding with a "silicate" or other "metalate".

As Binder

Silica Fume, Fine Alumina, Fine Titania, Fine Zinc Oxide etc and any other oxide that formed a sodium metallate.

Whilst typical formulations included both a "binder" and a "filler", experiments were conducted wherein bonded particulate materials were produced made solely of binder or solely of filler. The use of a binder together with a filler was preferred because this resulted in a more durable bonded particulate product. Also, this enabled the incorporation (as filler) of materials (eg. silaceous materials such as FAF) which would otherwise need to be disposed of as waste.

EXAMPLE 7

The following procedure was used to form bonded sand articles ("dogbone" test pieces), in order to evaluate the efficacy of the binder composition of the invention for forming sand moulds and cores.

1. Sand, 25% sodium hydroxide solution in water, and silica fume in the weight proportions listed in the table below were mixed together.
2. A test piece pattern (a so-called "dogbone") was formed from the mixture.
3. At a predetermined time the test piece was stripped "green" from the patterns, onto a porous ceramic or plastic tile.
4. The test piece was transferred to a microwave or conventional oven and dried*.

*Microwaved at 600 kW for 60 seconds, and/or subsequently heated to 700° C. for 2 minutes, or 15 minutes, or 30 minutes, or 60 minutes.

a microwave in a few minutes (test pieces took 1 minute, house bricks took 9 minutes). Conventional drying took a few hours (2–3 hours for test pieces). RF or Dielectric heating was also observed to be effective.

Microwaving was preferred as it enabled rapid drying, thus quickly terminating the metal oxide-alkali reaction.

Advantages/Benefits

The following advantages and benefits were observed for bonded particulate products made in accordance with the present invention.

| Product | Advantage/Benefit |
| --- | --- |
| Riser Sleeve | No fume produced when in contact with molten metal. Dimensionally accurate, cure was made in a microwave transparent core box. Had a lower density than other non-fibrous products. Fibre free. |
| Sand Mould or Core | No fume produced when in contact with molten metal. Breaks down easily in water after casting - particularly advantageous for non-ferrous castings. |
| Brick | Half the density of other conventional products rated to 1500° C., and thus substantially greater insulation capacity. |
| Launder | One third the density of other conventional launders used inthe aluminium smelting industry, resulting in a lower rate of heat loss, and a more energy efficient product. |

Applications outside the molten metal industries were also found, eg. fire walls/doors, sound insulation, fire proof ceiling panels, construction materials (such as bricks, pavers and tiles), in light weight construction etc. Formulation densities were easily varied (eg. by varying filler and binder quantities and qualities). Lower density (lighter) products were observed to be more suitable for use in these latter applications.

What is claimed is:

1. A method for producing a bonded particulate material comprising the steps of:

| Test No. | 40 | 41 | 42 | 43 | 44 | 45 |
| --- | --- | --- | --- | --- | --- | --- |
| Weight Sand | 100 | 100 | 100 | 100 | 100 | 100 |
| Weight 25% NaOH Solution | 10 | 10 | 3 | 3 | 2 | 1 |
| Weight Silica fume | — | 2 | 1 | 0.6 | 0.6 | 0.6 |
| Microwave (1 min) | Yes | Yes | Yes | Yes | Yes | No |
| Observations | Hand made dogbones, didn't bond when touched after MW | Held together, easy to handle | Held together, easy to handle | Held together, easy to mix and core blow | Easy to mix, wetting sand completely, core blows well. Optimum | Crumbled in hot box, did not form even after 2 mins |
| 700 deg C. | No | 2 mins | 2 mins | 2, 15, 30 & 60 mins | 2, 15, 30 & 60 mins | 2, 15, 30 & 60 mins |
| Water contact | | crumbled | crumbled | crumbled | crumbled | crumbled |
| Comments | | | | Strength @ 250 C. after 40s = 54 psi, after 1 min = 118 psi | 40 secs in the hot box | Did not work |

The compositions used in test numbers 41, 42, 43 and 44 were found to satisfactory for sand binding, but the optimum composition was that used in test number 44.

Mechanism

When silica (or alumina, etc) surfaces came into contact with "strong" sodium hydroxide a reaction started forming a sol-gel of partially soluble sodium silicate. The inner part of the silica particle remained solid silica while the outer layer contained increasing quantities of sodium. When pre-mixed this reaction was more efficient.

The activated silica fume then formed a tacky bond with the FAF (or other filler). The resulting product was cured in combining an alkali metal hydroxide with a finely divided particulate metal oxide that forms a metalate in the presence of the alkali metal hydroxide and that serves as a binder; and drying the particles after a portion of each metal oxide particle has formed the metalate as determined by the amount of dissolution of the metal oxide, in a manner such that an unreacted particle core remains after drying.

2. A method as claimed in claim 1, wherein the metal oxide is at least one selected from the group consisting of silica fume, finely divided alumina, finely divided titania, and finely divided zinc oxides.

3. A method as claimed in claim 1, wherein the alkali metal hydroxide is also combined with at least one filler material selected from the group consisting of flyash floaters, fly ash, silica sand, perlite, bauxite, alumina and mixtures thereof.

4. A method as claimed in claim 1, wherein the alkali metal hydroxide is also combined with a non-oxidisable filler material which binds with the metalate.

5. A method as claimed in claim 1, in which the metalate is hardened prior to the step of drying the particles.

6. A method as claimed in claim 5, in which the metalate is hardened by carbon dioxide gas.

7. A binder for bonding a particulate material, comprising:
   (a) a finely divided particulate metal oxide that forms a metalate in the presence or an alkali metal hydroxide;
   (b) an alkali metal hydroxide; and
   (c) water.

8. A binder as claimed in claim 7, in which the finely divided particulate metal oxide is at least one selected from the group consisting of silica fume, finely divided alumina, finely divided titania, finely divided zinc oxides, and mixtures thereof.

9. A binder as claimed in claim 7, in which the alkali metal hydroxide is at least one selected from the group consisting of sodium hydroxide and potassium hydroxide.

10. A binder as claimed in claim 7, in which the alkali metal hydroxide is present in an amount of 3–50 weight %, the finely divided particulate metal oxide is present in an amount of 10–70 weight %, and the water is present in an amount of 30–70 weight %, based upon the total weight of the binder.

11. A binder as claimed in claim 10, in which the alkali metal hydroxide is present in an amount of 3–25 weight %, the finely divided particulate metal oxide is present in an amount of 20–55 weight %, and the water is present in an amount of 40–60 weight %, based upon the total weight of the binder.

12. A composition for forming a bonded particulate article, comprising:
   (a) a binder as claimed in claim 7; and
   (b) a refractory particulate material.

13. A composition according to claim 12, in which the refractory particulate material is at least one selected from the group consisting of silica, alumina, aluminosilicate, and mixtures thereof.

14. A composition according to claim 13, wherein said refractory particulate material is in the form of hollow microspheres.

* * * * *